United States Patent
Suitou et al.

(10) Patent No.: US 6,647,737 B2
(45) Date of Patent: Nov. 18, 2003

(54) AIR CONDITIONER

(75) Inventors: Ken Suitou, Kariya (JP); Masaki Ota, Kariya (JP); Kenta Nishimura, Kariya (JP); Taku Adaniya, Kariya (JP); Ryo Matsubara, Kariya (JP); Yoshikazu Fukutani, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 8 days.

(21) Appl. No.: 09/859,278

(22) Filed: May 17, 2001

(65) Prior Publication Data

US 2002/0035842 A1 Mar. 28, 2002

(30) Foreign Application Priority Data

May 19, 2000 (JP) ........................................ 2000-147750

(51) Int. Cl.[7] .............................. G01H 11/00; F25B 1/00
(52) U.S. Cl. ...................... 62/228.3; 73/661.62; 73/756
(58) Field of Search ............................. 62/228.3–228.5; 417/222.2; 73/861.61, 661.62, 756; 236/1 EA (56) References Cited

U.S. PATENT DOCUMENTS 2,296,822 A * 9/1942 Wolfert ..................... 236/1 EA
3,100,972 A * 8/1963 Mobarry ................ 62/228.3 X
6,105,380 A * 8/2000 Yokomachi et al. ........ 62/228.3

FOREIGN PATENT DOCUMENTS

| EP | 0 748 937 A2 | 12/1986 | ........... F04B/27/18 |
| EP | 0 748 937 A3 | 1/1997 | ........... F04B/27/18 |
| EP | 0935107 A2 | 8/1999 | ........... F25B/49/02 |
| EP | 0 997 640 A2 | 5/2000 | ........... F04B/27/18 |
| EP | 0 997 640 A3 | 10/2000 | ........... F04B/27/18 |
| EP | 0935107 A3 | 1/2002 | ........... F25B/49/02 |
| JP | 11-324930 | 11/1999 | ........... F04B/49/00 |

* cited by examiner

*Primary Examiner*—William Wayner
(74) *Attorney, Agent, or Firm*—Morgan & Finnegan, LLP (57) ABSTRACT

A compressor includes a discharge chamber and a retaining passage, which is located downstream of the discharge chamber. A control valve controls the displacement of the compressor in relation to the pressure difference between a first pressure monitoring point in the discharge chamber and a second pressure monitoring point in the retaining passage. A pressure introducing passage connects the retaining passage to the control valve. The pressure introducing passage has an opening to the retaining passage. An inlet member is located in the retaining passage to cover the opening. The inlet member has a pressure introducing port that functions as the second pressure monitoring point. The pressure of the refrigerant in the retaining passage is supplied from the pressure introducing port to the control valve through the pressure introducing passage. The inlet member easily alters the position of the pressure introducing port in the retaining passage.

24 Claims, 6 Drawing Sheets

AIR CONDITIONER

BACKGROUND OF THE INVENTION

The present invention relates to a vehicle air conditioner.

Figure 7:
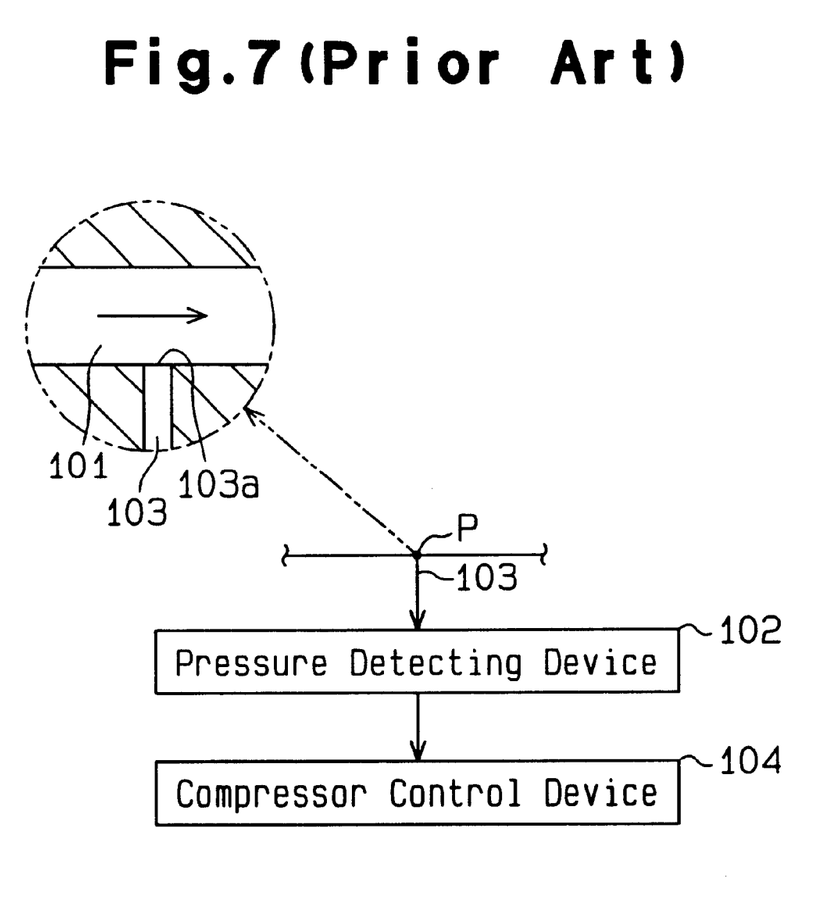
FIG. 7 is a schematic view showing a prior art displacement control mechanism.

A typical air conditioner of a vehicle includes a variable displacement type compressor and a displacement control mechanism for controlling the displacement of the compressor. FIG. 7 shows the displacement control mechanism by way of example. More specifically, a pressure monitoring point P is located in a refrigerant passage 101, which forms a refrigerant circuit. A pressure detecting device 102 detects the pressure of the refrigerant at the pressure monitoring point P. A pressure detecting passage 103 connects the pressure monitoring point P to the pressure detecting device 102. The refrigerant pressure at the pressure monitoring point P is thus supplied to the pressure detecting device 102. A compressor control device 104 controls the displacement of the variable displacement compressor in relation to the refrigerant pressure detected by the pressure detecting device 102.

As indicated in the circle of FIG. 7, the pressure detecting passage 103 has a pressure detecting port 103a that opens to the refrigerant passage 101. Accordingly, if the position of the pressure detecting port 103a relative to the refrigerant passage 101 need be altered, it is necessary to change the arrangement of the pressure detecting passage 103, thus causing trouble.

Particularly, if the pressure monitoring point P is located in the refrigerant passage 101 that is formed in a housing member of the compressor, the arrangement of the pressure detecting passage 103 in the housing member is restricted by the structure of the compressor. This makes it difficult to locate the pressure detecting port 103a at a desired position.

BRIEF SUMMARY OF THE INVENTION

It is an objective of the present invention to provide an air conditioner that easily alters the position of a pressure detecting port relative to a refrigerant passage.

To achieve the above objective, the present invention provides an air conditioning apparatus, which is provided with a refrigerant circuit that includes a variable displacement compressor. The air conditioner includes a displacement control mechanism, which controls the displacement of the compressor in accordance with a pressure at a pressure monitoring point in the refrigerant circuit. A pressure introducing passage connects the refrigerant circuit to the displacement control mechanism for supplying the pressure of the refrigerant in the refrigerant circuit from the pressure monitoring point to the displacement control mechanism. The pressure introducing passage has an opening to the refrigerant circuit. An inlet member is located at a position corresponding to the opening. The inlet member has a pressure introducing port that functions as the pressure monitoring point. The pressure of the refrigerant in the refrigerant circuit is supplied from the pressure introducing port to the displacement control mechanism through the pressure introducing passage.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described.

Figure 1:
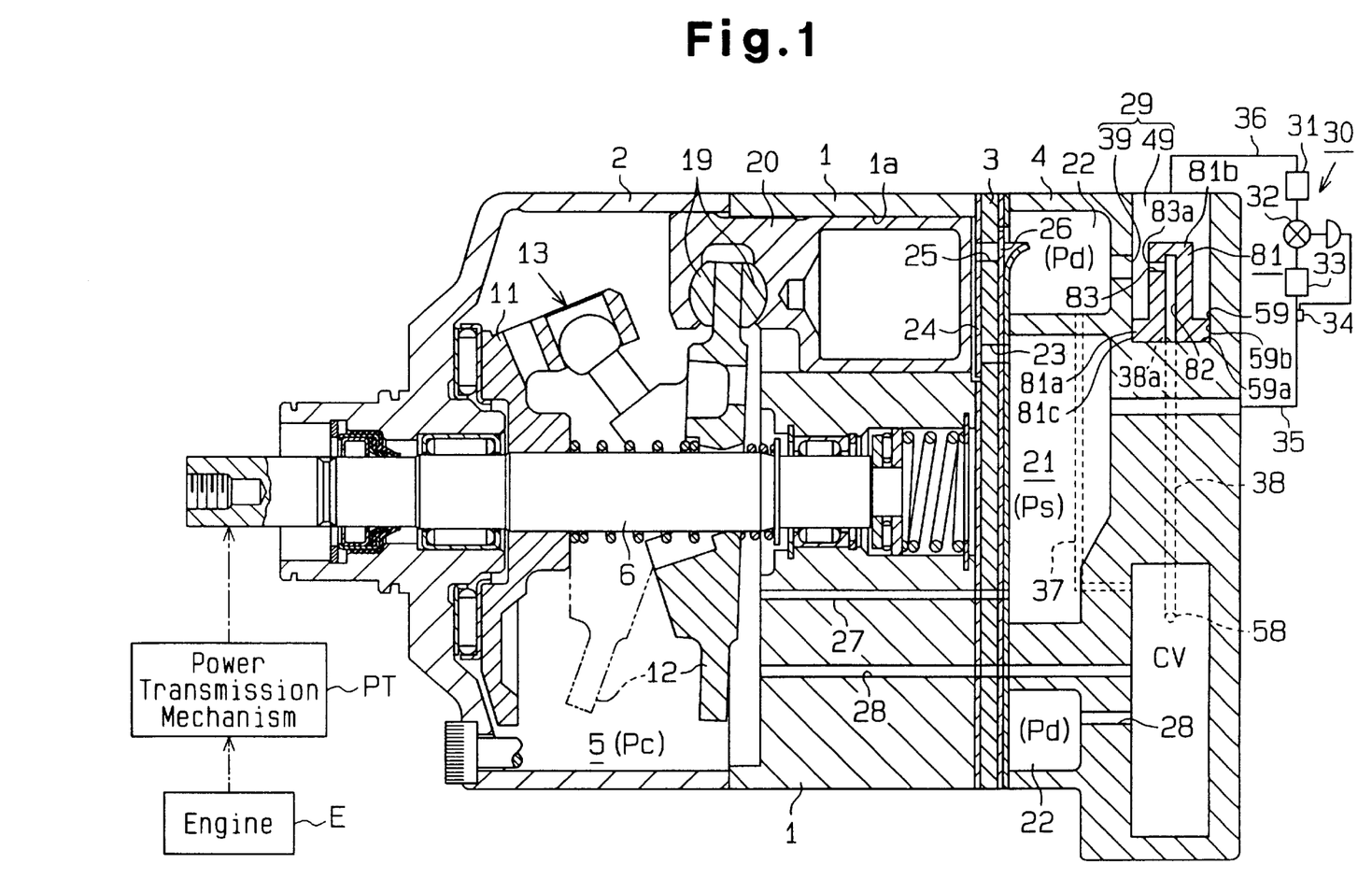
FIG. 1 is a cross-sectional view shoring an embodiment of a swash plate type variable displacement compressor according to the present invention.

The compressor shown in FIG. 1 includes a cylinder block 1, a front housing member 2 connected to the front end of the cylinder block 1, and a rear housing member 4 connected to the rear end of the cylinder block 1. A valve plate 3 is located between the rear housing member 4 and the cylinder block 1.

A crank chamber 5 is defined between the cylinder block 1 and the front housing member 2. A drive shaft 6 is supported in the crank chamber 5 by bearings. A lug plate 11 is fixed to the drive shaft 6 in the crank chamber 5 to rotate integrally with the drive shaft 6.

The front end of the drive shaft 6 is connected to an external drive source, which is an engine E in this embodiment, through a power transmission mechanism PT. In this embodiment, the power transmission mechanism PT is a clutchless mechanism that includes, for example, a belt and a pulley. Alternatively, the mechanism PT may be a clutch mechanism (for example, an electromagnetic clutch) that selectively transmits power in accordance with the value of an externally supplied current.

A drive plate, which is a swash plate 12 in this embodiment, is accommodated in the crank chamber 5. The swash plate 12 slides along the drive shaft 6 and inclines with respect to the axis of the drive shaft 6. A hinge mechanism 13 is provided between the lug plate 11 and the swash plate 12. The swash plate 12 is coupled to the lug plate 11 and the drive shaft 6 through the hinge mechanism 13. The swash plate 12 rotates synchronously with the lug plate 11 and the drive shaft 6.

Cylinder bores 1a (only one is shown in FIG. 1) are formed in the cylinder block 1 at constant angular intervals around the drive shaft 6. Each cylinder bore 1a accommodates a single headed piston 20 such that the piston 20 can reciprocate in the bore 1a. A compression chamber, the displacement of which varies in accordance with the reciprocation of the piston 20, is defined in each bore 1a. The front end of each piston 20 is connected to the periphery of the swash plate 12 through a pair of shoes 19. The rotation of the swash plate 12 is converted into reciprocation of the pistons 20, and the strokes of the pistons 20 depend on the inclination angle of the swash plate 12.

The valve plate 3 and the rear housing member 4 define, between them, a suction chamber 21 and a discharge chamber 22, which surrounds the suction chamber 21. The valve plate 3 forms, for each cylinder bore 1a, a suction port 23, a suction valve flap 24 for opening and closing the suction port 23, a discharge port 25, and a discharge valve flap 26 for opening and closing the discharge port 25. The suction chamber 21 communicates with each cylinder bore 1a through the corresponding suction port 23, and each cylinder bore 1a communicates with the discharge chamber 22 through the corresponding discharge port 25.

When each piston 20 moves from its top dead center position to its bottom dead center position, the refrigerant gas in the suction chamber 21 flows into the cylinder bore 1a through the corresponding suction port 23 and the corresponding suction valve flap 24. When the piston 20 moves from its bottom dead center position toward its top dead center position, the refrigerant gas in the cylinder bore 1a is compressed to a predetermined pressure, and it forces the corresponding discharge valve flap 26 to open. The refrigerant gas is then discharged through the corresponding discharge port 25 and the corresponding discharge valve flap 26 into the discharge chamber 22.

The inclination angle of the swash plate 12 (the angle between the swash plate 12 and a plane perpendicular to the axis of the drive shaft 6) is determined on the basis of various moments such as the moment of rotation caused by the centrifugal force upon rotation of the swash plate, the moment of inertia based on the reciprocation of the pistons 20, and a moment due to the gas pressure. The moment due to the gas pressure is based on the relationship between the pressure in the cylinder bores 1a and the crank pressure Pc. The moment due to the gas pressure increases or decreases the inclination angle of the swash plate 12 in accordance with the crank pressure Pc.

In this embodiment, the moment due to the gas pressure is changed by controlling the crank pressure Pc with a displacement control valve CV. The inclination angle of the swash plate 12 can be changed to an arbitrary angle between the minimum inclination angle (shown by a solid line in FIG. 1) and the maximum inclination angle (shown by a broken line in FIG. 1).

Figure 2:
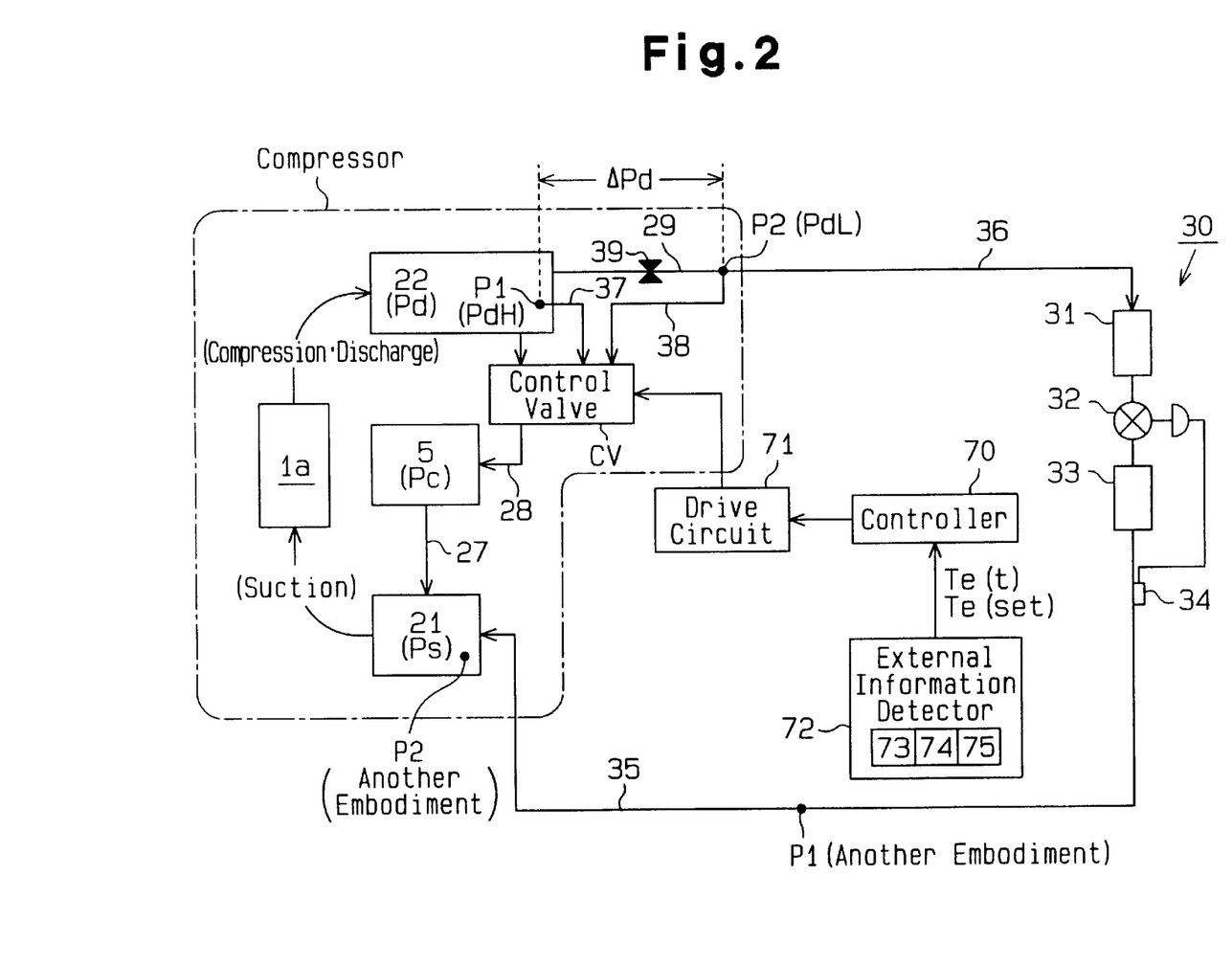
FIG. 2 is a circuit diagram schematically showing a refrigerant circuit.

As shown in FIGS. 1 and 2, a control mechanism for controlling the crank pressure Pc includes a bleed passage 27, a supply passage 28 and a displacement control valve CV. The bleed passage 27 connects the suction chamber 21, which is a suction pressure (Ps) zone, and the crank chamber 5. The supply passage 28 connects the discharge chamber 22, which is a discharge pressure (Pd) zone, and the crank chamber 5. The displacement control valve CV is provided midway along the supply passage 28.

The displacement control valve CV changes the opening size of the supply passage 28 to control the flow rate of refrigerant gas flowing from the discharge chamber 22 to the crank chamber 5. The pressure in the crank chamber 5 is changed in accordance with the relation between the flow rate of refrigerant gas flowing from the discharge chamber 22 into the crank chamber 5 and the flow rate of refrigerant gas flowing out from the crank chamber 5 through the bleed passage 27 into the suction chamber 21. In accordance with changes in the crank pressure Pc, the difference between the crank pressure Pc and the pressure in the cylinder bores 1a varies to change the inclination angle of the swash plate 12.

As a result, the stroke of the pistons 20 is changed to control the displacement.

As shown in FIGS. 1 and 2, the refrigerant circuit of the vehicle air conditioner includes the compressor and an external refrigerant circuit 30. The external refrigerant circuit 30 includes, for example, a condenser 31, a decompression device, which is an expansion valve 32 in this embodiment, and an evaporator 33. The opening of the expansion valve 32 is feedback-controlled on the basis of the temperature detected by a temperature sensing tube 34 provided near the outlet of the evaporator 33. The expansion valve 32 supplies a quantity of refrigerant corresponding to the thermal load to control the flow rate.

In the downstream part of the external refrigerant circuit 30, a low pressure passage, which is a flow pipe 35 in this embodiment, is provided to connect the outlet of the evaporator 33 with the suction chamber 21. In the upstream part of the external refrigerant circuit 30, a high pressure passage, which is a flow pipe 36 in this embodiment, is provided to connect the discharge chamber 22 of the compressor with the inlet of the condenser 31. To accommodate the refrigerant circuit in the vehicle, the flow pipe 36 has a bent portion 36a, at which the pipe 36 is bent at a right angle. The compressor draws refrigerant gas from the downstream side of the external refrigerant circuit 30, compresses the gas, and then discharges the compressed gas to the discharge chamber 22, which is connected to the upstream side of the external refrigerant circuit 30.

The higher the flow rate of the refrigerant flowing in the refrigerant circuit is, the greater the pressure loss per unit length of the circuit or piping is. More specifically, the pressure loss between two pressure monitoring points P1, P2 in the refrigerant circuit correlates with the flow rate of the refrigerant circuit. Detected difference in pressure (pressure difference $\Delta Pd$) between the pressure monitoring points P1 and P2 represents the flow rate of refrigerant in the refrigerant circuit.

In this embodiment, an upstream, or first, pressure monitoring point P1 is located in the discharge chamber 22. A downstream, or second, pressure monitoring point P2 is located in a housing refrigerant line 29. The housing refrigerant line 29 is formed in the rear housing member 4 and connects the discharge chamber 22 to the flow pipe 36. The gas pressure PdH at the first pressure monitoring point P1 and the gas pressure PdL at the second pressure monitoring point P2 are applied to the displacement control valve CV through first and second pressure introduction passages 37 and 38, respectively.

A fixed restrictor 39, which serves as a pressure difference increasing means, is formed in the housing refrigerant line 29 at a position between the first pressure monitoring point P1 and the second pressure monitoring point P2. The fixed restrictor 39 increases the pressure difference $\Delta Pd (\Delta Pd = PdH - PdL)$ between the two pressure monitoring points P1 and P2. The restrictor 39 permits the distance between the two pressure monitoring points P1 and P2 to be reduced and also permits the second pressure monitoring point P2 to be relatively close to the discharge chamber 22. Thus, the second pressure introduction passage 38, which extends from the second pressure monitoring point P2 to the control valve CV in the compressor, is shortened.

Figure 4A:
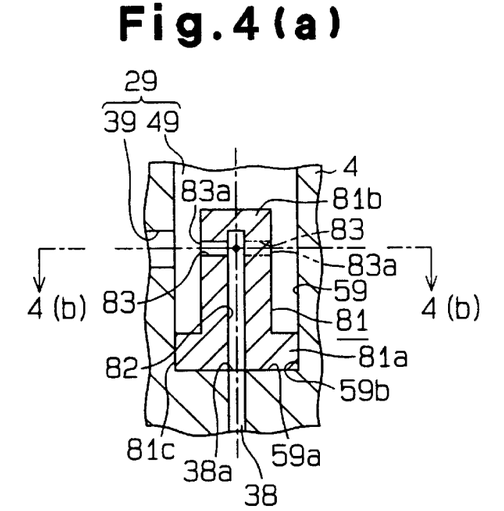
FIG. 4(a) is a cross-sectional view showing a portion of the compressor of FIG. 1 in the vicinity of a second pressure monitoring point.
Figure 4B:
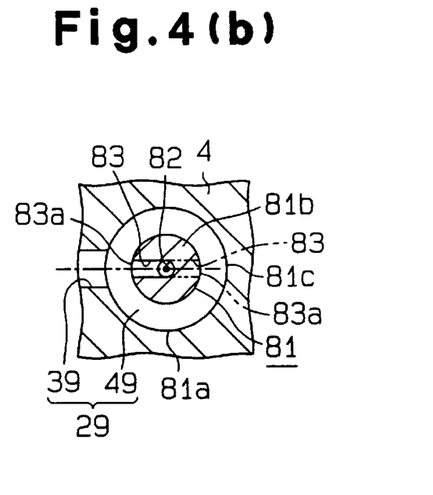
FIG. 4(b) is a cross-sectional view taken long line 4(b)—4(b) of FIG. 4(a)

As shown in FIGS. 1, 4(a) and 4(b), the housing refrigerant line 29 includes a large diameter path 49 and a small diameter path 39, which is also referred to as the fixed restrictor 39. The large diameter path 49, or a retaining passage, extends from the outer periphery of the rear housing member 4 toward the center of the rear housing member 4. The large diameter path 49 is located rearward of the discharge chamber 22 in the rear housing member 4. The small diameter path 39 extends perpendicular to the large diameter path 49 and is connected to the discharge chamber 22. The opening area of the small diameter path 39 is reduced as compared to those of the adjacent passages, thus functioning as the fixed restrictor 39. The large diameter path 49 extends to a point separate from the point at which the axis of the large diameter path 49 crosses the axis of the small diameter path 39. This structure forms a dead-end portion that functions as a support recess 59, or a support portion. The second pressure introduction passage 38 opens to the large diameter path 49 (the housing refrigerant line 29) at a position corresponding to the middle of a bottom 59a of the support recess 59.

A port position altering member 81, or an inlet member, includes a pillar-like base 81a and a cylindrical pressure detecting portion 81b. The diameter of the pressure detecting portion 81b is smaller than that of the base 81a. The pressure detecting portion 81b extends vertically from the middle of the base 81a. The port position altering member 81 is inserted in the large diameter path 49 such the base 81a faces the bottom 59a of the support recess 59. The port position altering member 81 is thus received in the large diameter path 49 with the base 81a abutted by the bottom 59a. The large diameter path 49 (the support recess 59) has an inner cylindrical wall 59b. The diameter of the inner cylindrical wall 59b is slightly smaller than that of an outer periphery 81c of the base 81a. Accordingly, the base 81a of the port position altering member 81 is securely fitted in the support recess 59 in accordance with a predetermined interference.

In the port position altering member 81, a first communication passage 82 is linearly formed in the middle of the base 81a and the pressure detecting portion 81b through, for example, drilling. More specifically, the first communication passage 82 axially extends from the bottom of the base 81a to a position near the distal end of the pressure detecting portion 81b. A second communication passage 83 is also linearly formed in the port position altering member 81 through drilling or the like. The second communication passage 83 forms a pressure detecting port 83a, which is an opening in the outer periphery of a distal portion of the pressure detecting portion 81b. The second communication passage 83 radially extends and is connected to the first communication passage 82.

When the bottom of the base 81a of the port position altering member 81 abuts against the bottom 59a of the support recess 59, the first communication passage 82 is connected to the opening 38a of the second pressure introduction passage 38. In this state, it is defined that the port position altering member 81 is positioned with respect to the opening 38a of the second pressure introduction passage 38 to close the opening 38a. When the port position altering member 81 is maintained in this state, the pressure detecting port 83a is substantially aligned with the small diameter path 39.

As described, the first communication passage 81 and the second communication passage 83 form a part of the second pressure introduction passage 38 in the interior of the port position altering member 81. Further, the second pressure introduction passage 38 is connected to the housing refrigerant line 29 (the second pressure monitoring point P2) substantially through the pressure detecting port 83a of the port position altering member 81.

Since the first pressure monitoring point P1 is located in the discharge chamber 22, the static pressure of refrigerant gas in the discharge chamber 22 is introduced to the control valve CV and is used as the monitored pressure PdH at the first pressure monitoring point P1. That is, since the volume of the discharge chamber 22 is relatively great, refrigerant gas flows relatively slowly and the ratio of dynamic pressure to the total pressure is low. Further, flows of refrigerant from the cylinder bores 1a are tangled in the discharge chamber 22. Therefore, regardless of how and to which part the first pressure introduction passage 37 is connected to the discharge chamber 22, the dynamic pressure in the discharge chamber 22 is scarcely reflected to the monitored pressure PdH. The first pressure introduction passage 37 is connected to the discharge chamber 22 preferably by the route shown by broken lines in FIG. 1 to minimize the influence of the dynamic pressure on the monitored pressure PdH. That is, the opening of the first pressure introduction passage 37 in the discharge chamber 22 is preferably spaced from the discharge ports 25 and the small diameter path 39.

The port position altering member 81 is fitted in the support recess 59 such that the pressure detecting port 83a faces the opening of the small diameter path 39. In other words, the pressure detecting port 83a is aligned with the opening of the small diameter path 39. Therefore, the total pressure of refrigerant flowing through the second pressure monitoring point P2, in other words, the sum of the static pressure and the total dynamic pressure element, is used as the pressure PdL, which is monitored at the second pressure monitoring point P2, and is introduced to the control valve CV from the pressure detecting port 83a.

When the flow rate of refrigerant in the refrigerant circuit is low, most of the total pressure of refrigerant that is flowing through the second pressure monitoring point P2 is static pressure. However, as the flow rate increases, or as the flowing speed of refrigerant increases, the dynamic pressure is increased above the static pressure. As a result, the ratio of the dynamic pressure to the total pressure increases. That is, compared to a comparison example, in which the static pressure at the second pressure monitoring point P2 is used as the monitored pressure PdL (the monitored pressure PdH at the first pressure monitoring point P1 is also a static pressure), higher monitored pressure PdL is introduced into the control valve CV as the flow rate increases.

Figure 5:
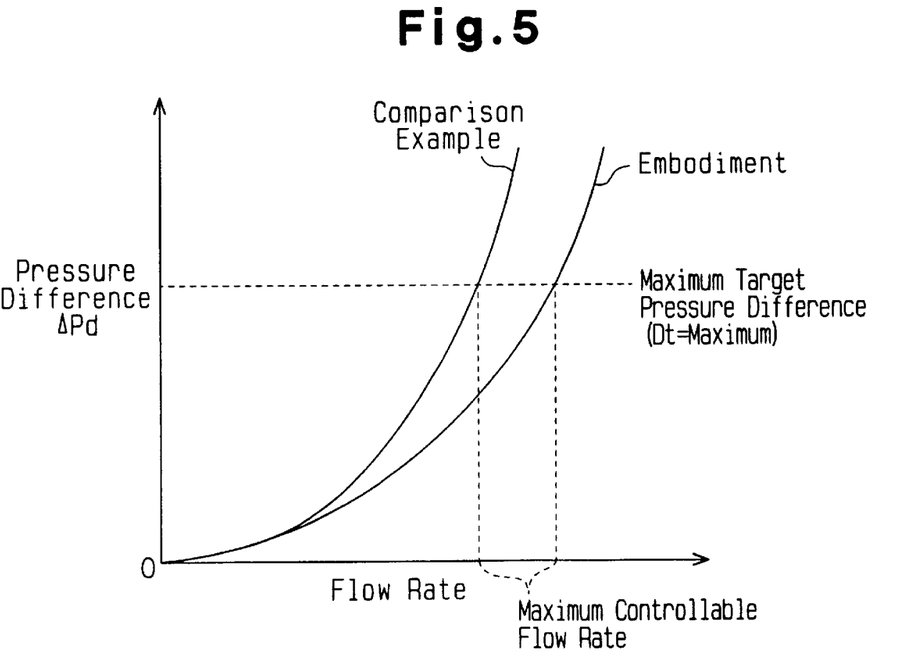
FIG. 5 is a graph representing the relationship between refrigerant flow and pressure difference between a pair of pressure monitoring points.

The graph of FIG. 5 shows the relationships between the flow rate in the refrigerant circuit and the pressure difference ΔPd. Both in the embodiment and the comparison example, the pressure difference ΔPd increases as the flow rate increases. However, the rate of increase in the pressure difference ΔPd is lower in the embodiment than that of the comparison example. In other words, the value of the flow rate that corresponds to a given pressure difference ΔPd is greater in the embodiment than in the comparison example. The difference in the pressure difference ΔPd between the comparison example and the embodiment is increased as the pressure difference ΔPd increases.

Figure 3:
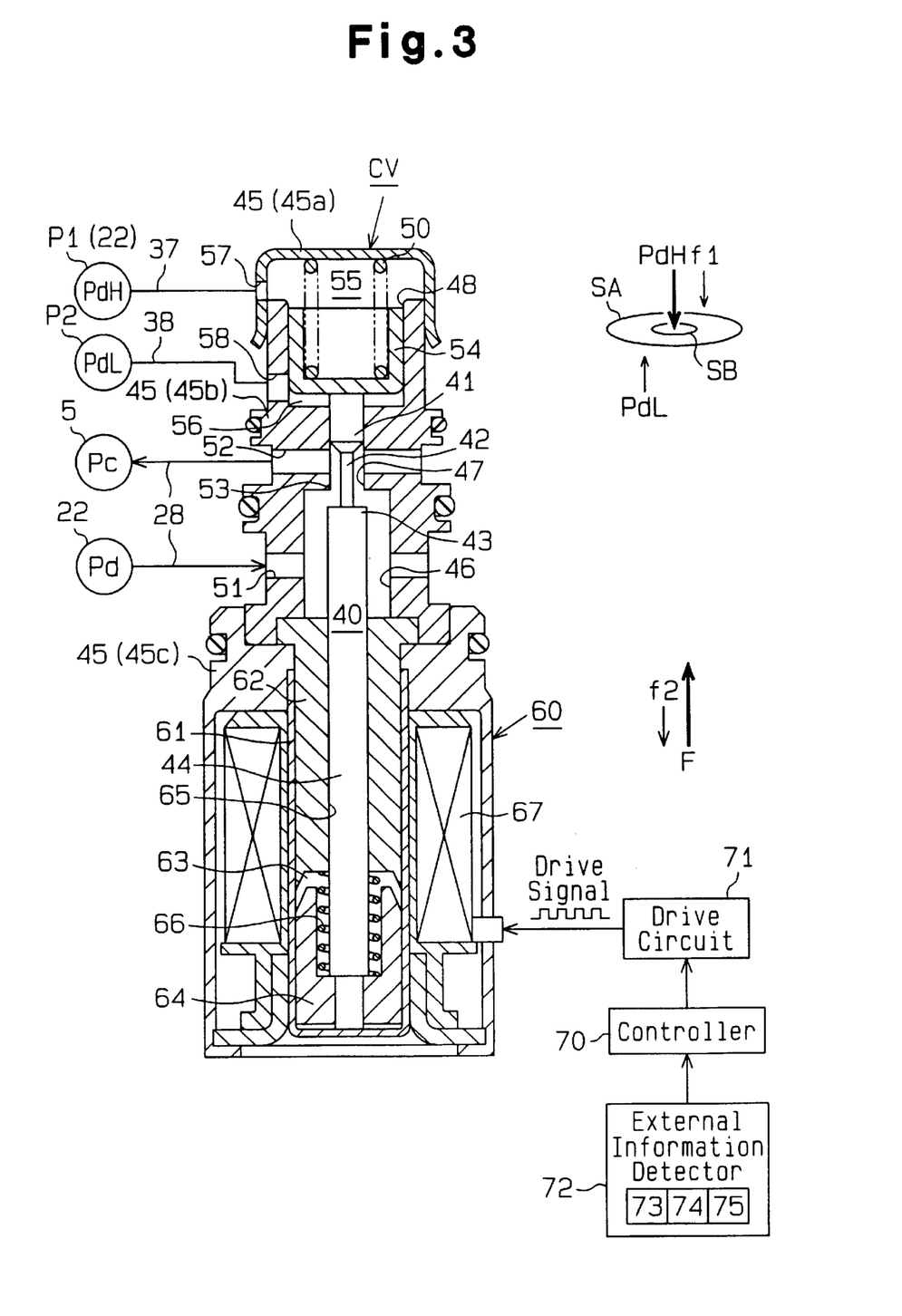
FIG. 3 is a cross-sectional view showing a control valve provided in the compressor of FIG. 1.

As shown in FIG. 3, the control valve CV has an inlet valve portion and a solenoid 60. The inlet valve portion controls the opening of the supply passage 28, which connects the discharge chamber 22 with the crank chamber 5. The solenoid 60 serves as an electromagnetic actuator for controlling a rod 40 located in the control valve CV on the basis of an externally supplied electric current. The rod 40 has a distal end portion 41, a valve body 43, a connecting portion 42, which connects the distal end portion 41 and the valve body 43 with each other, and a guide 44. The valve body 43 is part of the guide 44.

A valve housing 45 of the control valve CV has a cap 45a, an upper half body 45b and a lower half body 45c. The upper half portion 45b defines the shape of the inlet valve portion. The lower half body 45c defines the shape of the solenoid 60. A valve chamber 46 and a communication passage 47 are defined in the upper half body 45b. The upper half body 45b and the cap 45a define a pressure sensing chamber 48.

The rod 40 moves in the axial direction of the control valve CV, or vertically as viewed in the drawing, in the valve chamber 46 and the communication passage 47. The valve chamber 46 is selectively connected to and disconnected from the passage 47 in accordance with the position of the rod 40. The communication passage 47 is separated from the pressure sensing chamber 48 by the distal end portion 41 of the rod 40.

The bottom wall of the valve chamber 46 is formed by the upper end surface of a fixed iron core 62. A first radial port 51 allows the valve chamber 46 to communicate with the discharge chamber 22 through an upstream part of the supply passage 28. A second radial port 52 allows the communication passage 47 to communicate with the crank chamber 5 through a downstream part of the supply passage 28. Thus, the first port 51, the valve chamber 46, the communication passage 47, and the second port 52 form a part of the supply passage 28, which communicates the discharge chamber 22 with the crank chamber 5.

The valve body 43 of the rod 40 is located in the valve chamber 46. The inner diameter of the communication passage 47 is larger than the diameter of the connecting portion 42 of the rod 40 and is smaller than the diameter of the guide 44. That is, the opening area SB of the communication passage 47 (the cross sectional area of the distal end portion 41) is larger than the cross sectional area of the connecting portion 42 and smaller than the cross sectional area of the guide 44. A valve seat 53 is formed at the opening of the communication passage 47 (around the valve hole).

When the rod 40 moves from the lowest position shown in FIG. 3 to the highest position, at which the valve body 43 contacts the valve seat 53, the communication passage 47 is closed. Thus, the valve body 43 of the rod 40 serves as an inlet valve body that controls the opening of the supply passage 28.

A cup-shaped pressure sensing member 54 is located in the pressure sensing chamber 48. The pressure sensing member 54 moves axially in the pressure sensing chamber 48 and divides the pressure sensing chamber 48 into a first pressure chamber 55 and a second pressure chamber 56. The pressure sensing member 54 serves as a partition that separates the chambers 55 and 56 from each other and cuts off communication between the chambers 55 and 56. The cross sectional area SA of the pressure sensing member 54 is larger than the opening area SB of the communication passage 47.

A coil spring 50 is located in the P1 pressure chamber. The spring 50 urges the pressure sensing member 54 toward the Second pressure chamber 56.

The first pressure chamber 55 communicates with the discharge chamber 22, and the first pressure monitoring point P1, through a port 57 formed in the cap 45a and through the first pressure introduction passage 37. The second pressure chamber 56 communicates with the second pressure monitoring point P2 through a port 58 formed in the upper half body 45b of the valve housing 45 and through the second pressure introduction passage 38. Therefore, the first pressure chamber 55 is exposed to the monitored pressure PdH of the first pressure monitoring point P1, and the second pressure chamber 56 is exposed to the monitored pressure PdL of the second pressure monitoring point P2.

The solenoid 60 includes a cup-shaped cylinder 61. A fixed iron core 62 is fitted in the upper part of the cylinder 61. A solenoid chamber 63 is defined in the cylinder 61. A movable iron core 64 is accommodated to move axially in the solenoid chamber 63. An axially extending guide hole 65 is formed in the central portion of the fixed iron core 62. The guide 44 of the rod 40 is located to move axially in the guide hole 65.

The proximal end of the rod 40 is accommodated in the solenoid chamber 63. More specifically, the lower end of the guide 44 is fitted in a hole formed at the center of the movable iron core 64 and fixed by crimping. Thus, the movable iron core 64 and the rod 40 move integrally and axially.

A valve body urging coil 66 is located between the fixed and movable iron cores 62 and 64 in the solenoid chamber 63. The spring 66 urges the movable iron core 64 away from the fixed iron core 62. The spring 66 urges the rod 40 (the valve body 43) downward.

A coil 67 is wound about the stationary core 62 and the movable core 64. The coil 67 receives drive signals from a drive circuit 71 based on commands from a controller 70. The coil 67 generates an electromagnetic force F that corresponds to the value of the current from the drive circuit 71. The electromagnetic force F urges the movable core 64 toward the stationary core 62. The electric current supplied to the coil 67 is controlled by controlling the voltage applied to the coil 67. This embodiment employs duty control for controlling the applied voltage.

The position of the rod 40 in the control valve CV, i.e., the valve opening of the control valve CV, is determined as follows. In the following description, the influence of the pressure of the valve chamber 46, the communication passage 47, and the solenoid chamber 63 on the position of the rod 40 will not be taken into account.

When no current is supplied to the coil 67 (Dt=0%) as shown in FIG. 3, the downward force f1+f2 of the springs 50 and 66 is dominant. As a result, the rod 40 is moved to its lowermost position and causes the valve body 43 to fully open the communication passage 47. Accordingly, the crank pressure Pc is maximized under the current circumstances. Therefore, the difference between the crank pressure Pc and the pressure in the cylinder bores 1a is great, which minimizes the inclination angle of the swash plate 12 and the compressor displacement.

When a current of the minimum duty ratio Dt(min) is supplied to the coil 67, the upward electromagnetic force F is greater than the downward force f1+f2 of the springs 50 and 66, which moves the rod 40 upward. The upward electromagnetic force F is weakened by the downward force f2 of the spring 66. The net upward force (F−f2) acts against the net downward force of the downward force f1 of the spring 50 and the force based on the pressure difference ΔPd. Thus the valve body 43 of the rod 40 is positioned relative to the valve seat 53 to satisfy the following equation:

$$PdH \cdot SA - PdL(SA - SB) = F - f1 - f2$$

For example, if the flow rate of the refrigerant in the refrigerant circuit is decreased because of a decrease in speed of the engine E, the downward force based on the pressure difference ΔPd between the two points decreases, and the electromagnetic force F, at this time, cannot balance the forces acting on the rod 40. Therefore, the rod 40 moves upward, which compresses the springs 50 and 66. The valve body 43 of the rod 40 is positioned such that the increase in the downward force f1+f2 of the springs 50 and 66 compensates for the decrease in the downward force between on the pressure difference ΔPd between the two points. As a result, the opening of the communication passage 47 is reduced and the crank pressure Pc is decreased. As a result, the difference between the crank pressure Pc and the pressure in the cylinder bores 1a is reduced, the inclination angle of the swash plate 12 is increased, and the displacement of the compressor is increased. The increase in the displacement of the compressor increases the flow rate of the refrigerant in the refrigerant circuit to increase the pressure difference ΔPd between the two points.

In contrast, when the flow rate of the refrigerant in the refrigerant circuit is increased due to an increase in the speed of the engine E, the downward force based on the pressure difference ΔPd between the two points increases and the current electromagnetic force F cannot balance the forces acting on the rod 40. Therefore, the rod 40 moves downward, which expands the springs 50 and 66. The valve body 43 of the rod 40 is positioned such that the decrease in the downward force f1+f2 of the springs 50 and 66 compensates for the increase in the downward force based on the pressure difference ΔPd between the two points. As a result, the opening of the communication passage 47 is increased, the crank pressure Pc is increased, and the difference between the crank pressure Pc and the pressure in the cylinder bores 1a is increased. Accordingly, the inclination angle of the swash plate 12 is decreased, and the displacement of the compressor is also decreased. The decrease in the displacement of the compressor decreases the flow rate of the refrigerant in the refrigerant circuit, which decreases the pressure difference ΔPd.

When the duty ratio Dt of the electric current supplied to the coil 67 is increased to increase the electromagnetic force F, the pressure difference ΔPd between the two points cannot balance the forces on the rod 40. Therefore, the rod 40 moves upward, which compresses the springs 50 and 66. The valve body 43 of the rod 40 is positioned such that the increase in the downward force f1+f2 of the springs 50 and 66 compensates for the increase in the upward electromagnetic force F. As a result, the opening of the control valve CV, or the opening of the communication passage 47, is reduced and the displacement of the compressor is increased. Accordingly, the flow rate of the refrigerant in the refrigerant circuit is increased to increase the pressure difference ΔPd.

When the duty ratio Dt of the electric current supplied to the coil 67 is decreased and the electromagnetic force F is decreased accordingly, the pressure difference ΔPd between the two points cannot balance the forces acting on the rod 40. Therefore, the rod 40 moves downward, which decreases the downward force f1+f2 of the springs 50 and 66. The valve body 43 of the rod 40 is positioned such that the decrease in the force f1+f2 of the springs 50 and 66 compensates for the decrease in the upward electromagnetic force F. As a result, the opening of the communication passage 47 is increased and the displacement of the compressor is decreased. Accordingly, the flow rate of the refrigerant in the refrigerant circuit is decreased, which decreases the pressure difference ΔPd.

As described above, the target value of the pressure difference ΔPd is determined by the electromagnetic force F. The control valve CV automatically determines the position of the rod 40 according to changes of the pressure difference ΔPd to maintain the target value of the pressure difference ΔPd. T he target value of the pressure difference ΔPd is varied between a minimum value, which corresponds to the minimum duty ratio Dt(min), and a maximum value, which corresponds to the maximum duty ratio Dt(max), for example 100%.

As shown in FIGS. 2 and 3, the vehicle air conditioner has a controller 70. The controller 70 is a computer control unit including a CPU, a ROM, a RAM, and an I/O interface. An external information detector 72 is connected to the input terminal of the I/O interface. A drive circuit 71 is connected to the output terminal of the I/O interface.

The controller 70 performs an arithmetic operation to determine a proper duty ratio Dt on the basis of various pieces of external information, which is detected by the external information detector 72, and instructs the drive circuit 71 to output a drive signal corresponding to the duty ratio Dt. The drive circuit 71 outputs the drive signal of the instructed duty ratio Dt to the coil 67. The electromagnetic force F by the solenoid 60 of the control valve CV varies in accordance with the duty ratio Dt of the drive signal supplied to the coil 67.

The external information detector 72 is a group of devices for detecting the external information that reflects the cooling performance required for the refrigerant circuit. Sensors of the external information detector 72 include, e.g., an A/C switch (ON/OFF switch of the air conditioner operated by the passenger or the like) 73, a temperature sensor 74 for detecting an in-vehicle temperature Te(t), and a temperature setting unit 75 for setting a desired target value Te(set) of the in-vehicle temperature.

Figure 6:
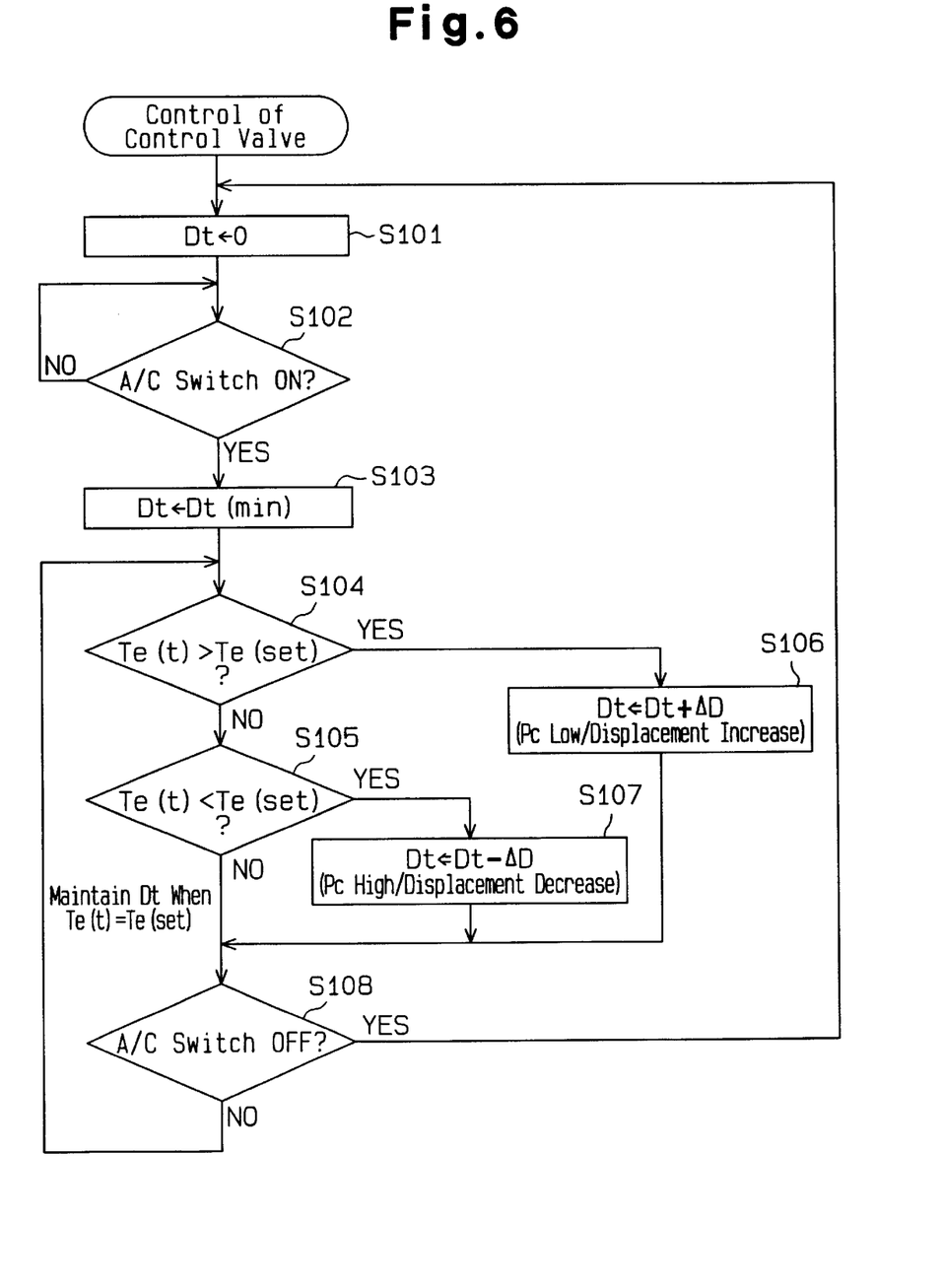
FIG. 6 is a flowchart representing a displacement control procedure of a control valve.

Next, the duty control of the control valve CV by the controller 70 will be described with reference to the flowchart of FIG. 6.

When the ignition switch (or the start switch) of the vehicle is turned on, the controller 70 is supplied with an electric current to start processing. In step S101, the controller 70 makes various initializations. For example, the controller 70 sets an initial duty ratio Dt of zero. After this, condition monitoring and internal processing of the duty ratio Dt are performed.

In step S102, the controller 70 monitors the ON/OFF state of the A/C switch 73 until the switch 73 is turned on. When the A/C switch 73 is turned on, in step S103, the controller 70 sets the duty ratio Dt of the control valve CV to the minimum duty ratio Dt(min) and starts the internal self-control function (target pressure difference maintenance) of the control valve CV.

In step S104, the controller 70 judges whether the detected temperature Te(t) by the temperature sensor 74 is higher than the target temperature Te(set). If step S104 is negative, in step S105, the controller 70 further judges whether the detected temperature Te(t) is lower than the target temperature Te(set). When step S105 is negative, then the detected temperature Te(t) is equal to the target temperature Te(set). Therefore, the duty ratio Dt need not be changed. Thus, the controller 70 does not instruct the drive circuit 71 to change the duty ratio Dt and step S108 is performed.

If step S104 is positive, the interior of the vehicle is hot and the thermal load is high. Therefore, in step S106, the controller 70 increases the duty ratio Dt by a unit quantity ΔD and instructs the drive circuit 71 to increment the duty ratio Dt to a new value (Dt+ΔD). As a result, the valve opening of the control valve CV is somewhat reduced, the displacement of the compressor is increased, the ability of the evaporator 33 to transfer heat is increased, and the temperature Te(t) is lowered.

If step S105 is positive, the interior of the vehicle is relatively cool and the thermal load is low. Therefore, in step S107, the controller 70 decrements the duty ratio Dt by a unit quantity ΔD, and instructs the drive circuit 71 to change the duty ratio Dt to the new value (Dt−ΔD). As a result, the valve opening of the control valve CV is somewhat increased, the displacement of the compressor is decreased, the ability of the evaporator 33 to transfer heat is reduced, and the temperature Te(t) is raised.

In step S108, it is judged whether or not the A/C switch 73 is turned off. If step S108 is negative, step S104 is performed. When step S108 is positive, step S101, in which the supply of the current to the control valve CV is stopped, is performed.

As described above, by changing the duty ratio Dt in step S106 and/or S107, even when the detected temperature Te(t) deviates from the target temperature Te(set), the duty ratio Dt is gradually optimized and the detected temperature Te(t) converges to the vicinity of the target temperature Te(set).

The embodiment of the present invention has the following advantages.

Assume that the air conditioner according to the present invention need be modified such that the static pressure at the second pressure monitoring point P2 is supplied to the control valve CV as the monitored pressure PdL. In this case, as indicated by the double-dotted broken lines in FIGS. 4(*a*) and 4(*b*), the port position altering member 81 is positioned with respect to the opening 38*a* of the second pressure introduction passage 38 such that the pressure detecting port 83*a* is located at a side opposite to the small diameter path 39. Accordingly, the position of the pressure detecting port 83*a* is easily altered without changing the arrangement of the second pressure introduction passage 38.

The pressure detecting portion 81*b* of the port position altering member 81 projects in the housing refrigerant line 29. Thus, as described, the position of the pressure detecting port 83*a* is easily altered such that the facing direction of the port 83*a* opposes the flow direction of the refrigerant. In other words, the port position altering member 81, which has the pressure detecting portion 81*b*, allows the dynamic pressure of the refrigerant gas to be easily reflected in the monitored pressure PdL.

The port position altering member 81 is positioned with respect to the opening 38*a* of the second pressure introduction passage 38 simply by securely fitting the port position altering member 81 in the housing refrigerant line 29.

The port position altering member 81 is securely fitted in the support recess 59. This structure firmly supports the port position altering member 81 in the housing refrigerant line 29.

The port position altering member 81 is secured in the support recess 59 simply through pressing, without using a fastener.

The port position altering member 81 is fitted in the support recess 59 (with respect to the cylindrical wall 59*b*), regardless whether or not the port position altering member 81 is held at a position rotated about the axis of the base 81*a*. Thus, the position (facing direction) of the pressure detecting port 83*a* is easily changed from the position indicated by the solid lines of FIGS. 4(*a*) and 4(*b*) to the position indicated by the broken lines of the drawings. More specifically, the port position altering member 81 is first removed from the support recess 59. The port position altering member 81 is then rotated about the axis to alter the facing direction of the pressure detecting port 83*a* as desired. Subsequently, as maintained in this rotated state, the port position altering member 81 is simply re-fitted in the support recess 59. Further, when the port position altering member 81 is actually installed in the compressor, it is easy to accurately adjust the position (facing direction) of the pressure detecting port 83*a* as desired.

The first communication passage 82 and the second communication passage 83 are each formed linearly in the port position altering member 81. The communication passages 82, 83 are thus easily formed through drilling or the like. Further, the first communication passage 82 is independent from the second communication passage 83. Thus, if the position of the pressure detecting port 83*a* need be changed in the port position altering member 81, only the second communication passage 83 is modified.

The second pressure monitoring point P2 is located in the housing refrigerant line 29, which is formed in the rear housing member 4 of the variable displacement compressor. The arrangement of the second pressure introduction passage 38 in the rear housing member 4 is restricted by other compressor constituents (for example, the suction chamber 21 and the discharge chamber 22). However, the port position altering member 81 according to the present invention is capable of altering the position of the pressure monitoring port 83*a* as desired without changing the arrangement of the second pressure introduction passage 38. That is, the port position altering member 81 is particularly effective in this structure.

The suction pressure Ps, which is influenced by the thermal load in the evaporator 33, is not directly referred to for controlling the opening of the control valve CV. Instead, the pressure difference ΔPd between the pressure monitoring points P1 and P2 in the refrigerant circuit is directly controlled for feedback controlling the displacement of the compressor. Therefore, the displacement is scarcely influenced by the thermal load of the evaporator 33. In other words, the displacement is quickly and accurately controlled by external control of the controller 70 in accordance with the speed of the engine E. Particularly, when the engine speed increases, the compressor displacement is quickly decreased, which improves the fuel economy of the engine E.

The target pressure difference, according to which the opening of the control valve CV is controlled, is changed by changing the duty ratio Dt. Thus, compared to a control valve that has no electromagnetic structure, or has a fixed target pressure difference, the control valve CV is suitable for finely controlling the air conditioner as shown in the flowchart of FIG. 6.

In the control valve of the comparison example, in which the pressures monitored PdH, PdL at the pressure monitoring points P1, P2 are static pressures, the distance between the pressure monitoring points P1 and P2 or the throttle amount of the restrictor 39 must be changed to change the relationship between the flow rate and the pressure difference ΔPd.

However, in this embodiment, a dynamic pressure element is added to the static pressure of refrigerant that is flowing through the second pressure monitoring point P2 and the resultant is introduced to the control valve CV and is used as the monitored pressure PdL. Thus, the relationship between the flow rate and the pressure difference ΔPd is different from that of the comparison example. That is, in this embodiment, the monitored pressure PdL reflects dynamic pressure, which enables the relationship between the flow rate and the pressure difference ΔPd to be variable, which adds to the flexibility of the design.

When the duty ratio Dt is maximum, the pressure difference ΔPd that satisfies the above equation is the maximum target pressure difference of the control valve CV, which represents the maximum controllable flow rate of the refrigerant circuit. As described above, for a given level of the pressure difference ΔPd, the flow rate of refrigerant is greater in this embodiment than in the comparison example. Compared to the comparison example, the maximum controllable flow rate is greater in this embodiment.

In the comparison example, the throttle amount of the restrictor 39 may be decreased for increasing the maximum controllable flow rate of refrigerant so that the pressure difference ΔPd is not significantly increased when the flow rate increases. However, if the throttle amount of the restrictor 39 is decreased, the pressure difference ΔPd is scarcely changed by a change of the flow rate when the flow rate is small. Therefore, when controlling the flow rate in a low flow rate region, the duty ratio Dt must be adjusted in a narrow range, which makes it difficult to accurately control the flow rate.

As described above, this embodiment increases the maximum controllable flow rate while maintaining the controllability of the flow rate in the low flow rate region.

A compressor for a vehicle air conditioner is generally accommodated in small engine compartment, which limits the size of the compressor. Therefore, the size of the control valve CV and the size of the solenoid 60 (coil 67) are limited. Also, the solenoid 60 is generally driven by a battery that is used for controlling the engine. The voltage of the battery is, for example, between twelve to twenty-four volts.

To increase the maximum controllable flow rate in the comparison example, the maximum level of the electromagnetic force F of the solenoid 60, which represents the maximum pressure difference, may be increased. To increase the maximum level of the electromagnetic force F, the size of the coil 67 must be increased or the voltage of the power source must be increased. However, this requires a significant change of the existing design of the surrounding devices and is therefore almost impossible. In other words, to increase the maximum controllable flow rate of the control valve CV, which is used in a compressor of a vehicle air conditioner, this embodiment, does not increase the size of the coil 67 (the control valve CV) and the voltage of the power source, is most suitable.

The pressure difference ΔPd in the control valve CV is mechanically detected and directly affects the position of the rod 40 (the valve body 43). Therefore, the control valve CV does not require an expensive pressure sensor for electrically detecting the pressure difference ΔPd. This reduces the number of parameters for computing the duty ratio Dt and, thus, reduces the calculation load of the controller 70.

The illustrated embodiment may be modified as follows without departing from the spirit of the present invention.

The port position altering member 81 may be located at the opening of the first pressure introduction passage 37 connected to the first pressure monitoring point P1. If this is the case, the first pressure introduction passage 37 is connected to the first pressure monitoring point P1 substantially through the pressure detecting port 83a of the port position altering member 81.

A pair of port position altering member 81 may be provided. In this case, one port position altering member 81 is located at the opening of the first pressure introduction passage 37 connected to the first pressure monitoring point P1. The other is located at the opening of the second pressure introduction passage 38 connected to the second pressure monitoring point P2. Accordingly, each pressure introduction passage 37, 38 is connected to the associated pressure monitoring point P1, P2 substantially through the pressure detecting port 83a of the associated port position altering member 81.

In the illustrated embodiment, the port position altering member 81 is a projection that is fitted in the support recess 59. However, the port position altering member 81 may have a concave shape while the support recess 59 is replaced by a support projection. In this case, the support projection is fitted in the port position altering member.

As labeled as another embodiment in FIG. 2, the first pressure monitoring point P1 may be located between the evaporator 33 and the suction chamber 21 (in the pipe 35 in the drawing), and the second pressure monitoring point P2 may be located in the suction pressure zone and downstream of the first pressure monitoring point P1 (in the suction chamber 21 in the drawing).

A pressure sensor may be used as a pressure detecting means.

The control valve CV may be a so-called outlet control valve for controlling the crank pressure Pc by controlling the opening of the bleed passage 27.

A single pressure monitoring point may be located in the suction pressure zone of the refrigerant circuit. In this case, the displacement of the variable displacement compressor is controlled in relation to the absolute value of the suction pressure measured at the pressure monitoring point.

The present invention can be embodied in a control valve of a wobble type variable displacement compressor.

A clutch mechanism such as an electromagnetic clutch may be employed as the power transmission mechanism PT.

Therefore, the present examples and embodiments are to be considered as illustrative and not restrictive and the invention is not to be limited to the details given herein, but may be modified within the scope and equivalence of the appended claims.

What is claimed is:

1. An air conditioning apparatus provided with a refrigerant circuit that includes a variable displacement compressor, wherein the air conditioner comprises:

a displacement control mechanism, which controls the displacement of the compressor in accordance with the pressure difference between a first pressure monitoring point and a second pressure monitoring point such that the pressure difference seeks a predetermined target value, wherein the first and second pressure monitoring points are located in the refrigerant circuit;

a pressure introducing passage, which connects the refrigerant circuit to the displacement control mechanism for supplying the pressure of the refrigerant in the refrigerant circuit from one of the pressure monitoring points to the displacement control mechanism, wherein the pressure introducing passage has an opening to the refrigerant circuit; and an inlet member, which is located at a position corresponding to the opening, wherein the inlet member has a pressure introducing port that functions as the one pressure monitoring point, wherein the pressure of the refrigerant in the refrigerant circuit is supplied from the pressure introducing port to the displacement control mechanism through the pressure introducing passage, and wherein the inlet member is arranged to be capable of changing the relationship between the flow rate in the refrigerant circuit and the pressure difference.

2. The air conditioning apparatus as set forth in claim 1, wherein the inlet member is exposed to a flow of the refrigerant in the refrigerant circuit.

3. The air conditioning apparatus as set forth in claim 1, wherein a support portion is located in the refrigerant circuit for supporting the inlet member.

4. The air conditioning apparatus as set forth in claim 3, wherein the support portion has a recess in which the inlet member is fitted.

5. The air conditioning apparatus as set forth in claim 3, wherein the support portion includes a recess that has a cylindrical wall, and the inlet member has a cylindrical portion that is fitted in the space defined by the cylindrical wall.

6. The air conditioning apparatus as set forth in claim 5, wherein the opening of the pressure introducing passage is formed on the bottom of the recess, the inlet member has an internal passage that is connected to the pressure introducing port, and the internal passage connects the pressure introducing port to the opening when the inlet member is fitted in the recess.

7. The air conditioning apparatus as set forth in claim 6, wherein the internal passage includes an axial line that is connected to the opening of the pressure introducing passage and a radial line that extends radially from the axial line, the pressure introducing port is formed at an end of the radial line, and the axial line and the opening are located along the axis of the cylindrical wall.

8. The air conditioning apparatus as set forth in claim 1, wherein the inlet member has a linear axial line that is connected to the opening of the pressure introducing passage and a linear radial line that extends radially from the axial line, and the pressure introducing port is formed at an end of the radial line.

9. The air conditioning apparatus as set forth in claim 1, wherein the first pressure monitoring point and second pressure monitoring point are located in the compressor.

10. The air conditioning apparatus as set forth in claim 1, wherein the inlet member is located in the compressor.

11. The air conditioning apparatus as set forth in claim 1, wherein the compressor includes a discharge chamber and a retaining passage that form a part of the refrigerant circuit, the discharge chamber is located upstream of the retaining passage, one pressure monitoring point is located in the discharge chamber with the other located in the retaining passage, and the inlet member is located in the retaining passage.

12. The air conditioning apparatus as set forth in claim 11, wherein the compressor includes a communication passage that connects the discharge chamber to the retaining passage, and the pressure introducing port is substantially aligned with the communication passage.

13. The air conditioning apparatus as set forth in claim 1, further comprising:
 a device, which obtains external information that reflects the cooling performance required for the refrigerant circuit; and
 a controller, which determines the target value according to the external information obtained by the device, wherein the controller instructs the displacement control mechanism to operate in accordance with the determined value.

14. A variable displacement compressor comprising:
 a discharge chamber;
 a retaining passage, which is connected to the discharge chamber and is located downstream of the discharge chamber;
 a displacement control mechanism, which controls the displacement of the compressor in accordance with the pressure difference between a first pressure monitoring point and a second pressure monitoring point such that the pressure difference seeks a predetermined target value, and the first pressure monitoring point is located in the discharge chamber while the second pressure monitoring point is located in the retaining passage;
 a first pressure introducing passage, which connects the discharge chamber to the displacement control mechanism for supplying the pressure of refrigerant in the discharge chamber from the first pressure monitoring point to the displacement control mechanism;
 a second pressure introducing passage, which connects the retaining passage to the displacement control mechanism for supplying the pressure of refrigerant in the retaining passage from the second pressure monitoring point to the displacement control mechanism, the second pressure introducing passage having an opening to the retaining passage; and
 an inlet member, which is located in the retaining passage to cover the opening, wherein the inlet member has a pressure introducing port that functions as the second pressure monitoring point, wherein the pressure of the refrigerant in the retaining passage is supplied from the pressure introducing port to the displacement control mechanism through the second pressure introducing passage.

15. The compressor as set forth in claim 14, wherein the retaining passage has a recess in which the inlet member is fitted.

16. The compressor as set forth in claim 15, therein the recess has a cylindrical wall, and the inlet member has a cylindrical portion that is fitted in the space defined by the cylindrical wall.

17. The compressor as set forth in claim 16, wherein the opening of the second pressure introducing passage is formed on the bottom of the recess, the inlet member has an internal passage that is connected to the pressure introducing port, and the internal passage connects the pressure introducing port to the opening when the inlet member is fitted in the recess.

18. The compressor as set forth in claim 17, wherein the internal passage has an axial line that is connected to the opening of the second pressure introducing passage and a radial line that extends radially from the axial line, the pressure introducing port is formed at an end of the radial line, and the axial line and the opening are located along the axis of the cylindrical wall.

19. The compressor as set forth in claim 14, further comprising a communication passage that connects the discharge chamber to the retaining passage, and the pressure introducing port is substantially aligned with the communication passage.

20. An air conditioning apparatus provided with a refrigerant circuit that includes a variable displacement compressor, wherein the air conditioner comprises:
 a displacement control mechanism, which controls the displacement of the compressor in accordance with a pressure at a pressure monitoring point in the refrigerant circuit;
 a pressure introducing passage, which connects the refrigerant circuit to the displacement control mechanism for supplying the pressure of the refrigerant in the refrigerant circuit from the pressure monitoring point to the displacement control mechanism, wherein the pressure introducing passage has an opening to the refrigerant circuit;
 an inlet member, which is located at a position corresponding to the opening, wherein the inlet member has a pressure introducing port that functions as the pressure monitoring point, wherein the pressure of the refrigerant in the refrigerant circuit is supplied from the pressure introducing port to the displacement control mechanism through the pressure introducing passage; and a support portion, which is located in the refrigerant circuit for supporting the inlet member.

21. An air conditioning apparatus provided with a refrigerant circuit that includes a variable displacement compressor, wherein the air conditioner comprises:

a displacement control mechanism, which controls the displacement of the compressor in accordance with a pressure at a pressure monitoring point in the refrigerant circuit;

a pressure introducing passage, which connects the refrigerant circuit to the displacement control mechanism for supplying the pressure of the refrigerant in the refrigerant circuit from the pressure monitoring point to the displacement control mechanism, wherein the pressure introducing passage has an opening to the refrigerant circuit; and an inlet member, which is located at a position corresponding to the opening, wherein the inlet member has a pressure introducing port that functions as the pressure monitoring point, wherein the pressure of the refrigerant in the refrigerant circuit is supplied from the pressure introducing port to the displacement control mechanism through the pressure introducing passage, wherein the inlet member has a linear axial line that is connected to the opening of the pressure introducing passage and a linear radial line that extends radially from the axial line, and the pressure introducing port is formed at an end of the radial line.

22. An air conditioning apparatus provided with a refrigerant circuit that includes a variable displacement compressor, wherein the air conditioner comprises:

a displacement control mechanism, which controls the displacement of the compressor in accordance with a pressure at a pressure monitoring point in the refrigerant circuit;

a pressure introducing passage, which connects the refrigerant circuit to the displacement control mechanism for supplying the pressure of the refrigerant in the refrigerant circuit from the pressure monitoring point to the displacement control mechanism, wherein the pressure introducing passage has an opening to the refrigerant circuit; and an inlet member, which is located at a position corresponding to the opening, wherein the inlet member has a pressure introducing port that functions as the pressure monitoring point, wherein the pressure of the refrigerant in the refrigerant circuit is supplied from the pressure introducing port to the displacement control mechanism through the pressure introducing passage, wherein the pressure monitoring point is located in the compressor.

23. An air conditioning apparatus provided with a refrigerant circuit that includes a variable displacement compressor, wherein the air conditioner comprises:

a displacement control mechanism, which controls the displacement of the compressor in accordance with a pressure at a pressure monitoring point in the refrigerant circuit;

a pressure introducing passage, which connects the refrigerant circuit to the displacement control mechanism for supplying the pressure of the refrigerant in the refrigerant circuit from the pressure monitoring point to the displacement control mechanism, wherein the pressure introducing passage has an opening to the refrigerant circuit; and an inlet member, which is located at a position corresponding to the opening, wherein the inlet member has a pressure introducing port that functions as the pressure monitoring point, wherein the pressure of the refrigerant in the refrigerant circuit is supplied from the pressure introducing port to the displacement control mechanism through the pressure and wherein the inlet member is located in the compressor.

24. An air conditioning apparatus provided with a refrigerant circuit that includes a variable displacement compressor, wherein the air conditioner comprises:

a displacement control mechanism, which controls the displacement of the compressor in accordance with a pressure at a pressure monitoring point in the refrigerant circuit;

a pressure introducing passage, which connects the refrigerant circuit to the displacement control mechanism for supplying the pressure of the refrigerant in the refrigerant circuit from the pressure monitoring point to the displacement control mechanism, wherein the pressure introducing passage has an opening to the refrigerant circuit; and an inlet member, which is located at a position corresponding to the opening, wherein the inlet member has a pressure introducing port that functions as the pressure monitoring point, wherein the pressure of the refrigerant in the refrigerant circuit is supplied from the pressure introducing port to the displacement control mechanism through the pressure introducing passage, wherein the inlet member is arranged to be capable of altering the direction of the pressure introducing port.

* * * * *

UNITED STATES PATENT AND TRADEMARK OFFICE
CERTIFICATE OF CORRECTION

PATENT NO.    : 6,647,737 B2
DATED         : November 18, 2003
INVENTOR(S)   : Ken Suitou et al.

It is certified that error appears in the above-identified patent and that said Letters Patent is hereby corrected as shown below:

<u>Column 9,</u>
Line 65, please delete "T he" and insert therefore -- The --

Signed and Sealed this

Thirteenth Day of January, 2004

JON W. DUDAS
*Acting Director of the United States Patent and Trademark Office*